April 15, 1924.
R. H. DUNHAM
TIRE SUPPORT
Filed Oct. 24, 1921
1,490,602
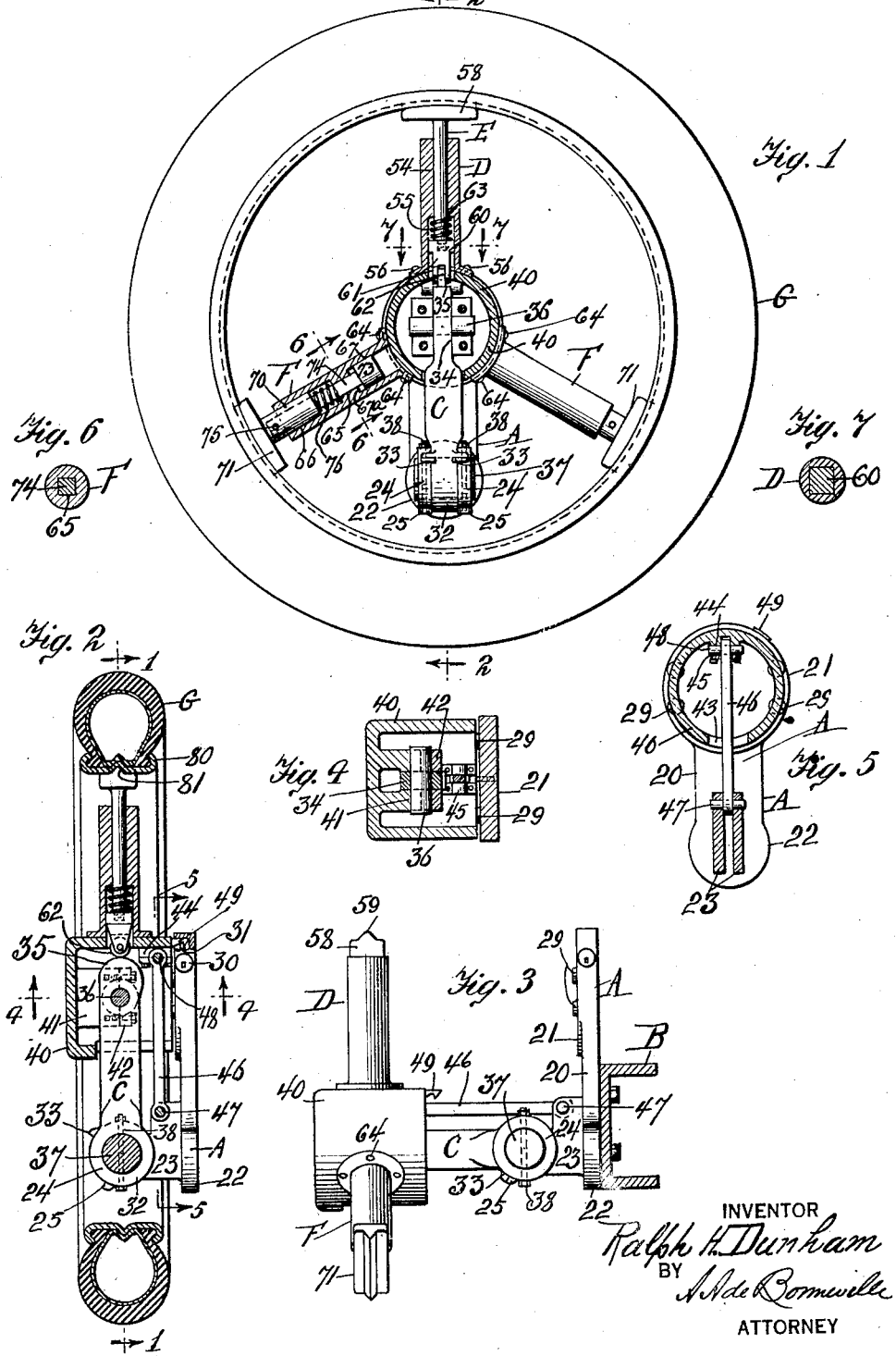
INVENTOR
Ralph H. Dunham
BY
A. A. de Bonneville
ATTORNEY Patented Apr. 15, 1924.

1,490,602

UNITED STATES PATENT OFFICE.

RALPH H. DUNHAM, OF JERSEY CITY, NEW JERSEY.

TIRE SUPPORT.

Application filed October 24, 1921. Serial No. 509,874.

*To all whom it may concern:*

Be it known that I, RALPH H. DUNHAM, a citizen of the United States, and a resident of Jersey City, in the county of Hudson and State of New Jersey, have invented certain new and useful Improvements in a Tire Support, of which the following is a specification.

This invention relates to a tire support. The object of the invention is the production of such a device, wherewith a spare vehicle tire can be securely clamped and locked in position to its vehicle and which can be easily detached therefrom.

The organization of the invention comprises a plurality of spring actuated locking shoes that operate in conjunction with a spring and cam actuated locking shoe, to lock and maintain a tire in position. The support is operated by locating its parts in a locked or unlocked position with the tire supported thereon.

In the drawings which exemplify one form of the invention Fig. 1 shows an elevation of a tire, a partial front view of the support in its elevated position and a section of Fig. 2 as on the line 1, 1; Fig. 2 represents a section of Fig. 1 on the line 2, 2; Fig. 3 indicates a side view of the support in its lowered position; Fig. 4 is a section of Fig. 2 on the line 4, 4; Fig. 5 represents a section of Fig. 2 on the line 5, 5; Fig. 6 represents a section of Fig. 1 on the line 6, 6 and Fig. 7 shows a section of Fig. 1 on the line 7, 7.

The support comprises a stationary bracket indicated in its entirety by the letter A and which is fastened to a portion of the vehicle indicated by the letter B.

The bracket A comprises the vertical member 20, with the upper circular portion 21 and the lower circular portion 22. A pair of webs 23 extend from the portion 22.

Supports 24 extend from the webs 23 and have formed therewith the heels 25. In the circular portion 21 are secured bumpers 29 of pliable material. A lock 30 with a latch 31 is provided for the portion 21.

A lifting arm is designated in its entirety by the letter C and comprises the cylindrical end 32 with the heels 33 and the upper narrowed end 34 having the cam 35 formed therewith. A journal pin 36 extends through the end 34. A shaft 37 extends through the end 32 of the arm C and through the supports 24. Bolts 38 extend through the supports 24 and the shaft 37.

A cup shaped hub 40 has formed therewith a journal bearing 41 that is provided with the removable cap 42. The journal pin 36 is supported in the journal bearing 41. An opening 43 is formed in the hub 40 to allow the arm C to swing therethrough. A journal bearing 44 is formed with the upper portion of the hub 40 and is provided with the removable cap 45. A parallel arm 46 is pinned at one end to the webs 23 by means of the pin 47 and at its other end is provided with a pin 48 that is supported in the journal bearing 44. A latch 49 extends from said hub 40 which coacts with the latch 31 of the lock 30.

A vertical tubular arm D with the upper cylindrical opening 54 and the lower square opening 55 is fastened at its lower end to the outer cylindrical surface of the hub 40, by means of the screws 56 and extends radially therefrom. A plunger E has attached to its upper end the locking shoe 58 having the locking ridge 59. A journal bracket with the square portion 60 and the journal end 61 is fastened to the plunger E and has journaled therein the cam roller 62, that coacts with the cam 35. A spring 63 bears between the top face of the square portion 60 and the roof of the opening 55.

Similar tubular arms F radially extend from the outer face of the hub 40 and are fastened thereto by means of the screws 64. Each of the arms F has a central contracted portion 65 square in cross-section with the tubular ends 66 and 67. In each of the arms F is slidably supported the sleeve 70 in the end 66 thereof and has extending therefrom the locking shoe 71 similar to 58. A cylindrical cap 73 is slidably supported in the tubular end 67 of each arm F, and has extending therefrom the square stem 74, which extends into the sleeve 70 and is fastened thereto by the pin 75. A spring 76 bears between the bottom end of the sleeve 70 and the adjacent end of the contracted portion 65. The arms D and F are in this instance disposed one hundred and twenty degrees apart and in radial directions extending through the axial centre of the hub 40.

To use the tire support the lifting arm C is brought to its horizontal and lowered position as indicated in Fig. 3 and a tire G with its ring 80 having the circumferential depression 81 is located upon the locking shoe 58, the ridge 59 locking with the depression 81. The lifting arm C is then brought to a vertical position as indicated in Figs. 1 and 2 and the lower portion of the ring 80 is locked with the locking shoes 71. While the tire support is swinging from a horizontal to a vertical position the cam 35 of the arm C bears against the cam roller 62 and forces the shoe 58 against the tension of the spring 63 and locks it with the ring 80. At the same time the springs 76 force the shoes 71 against the ring 80 and locks them therewith. When the tire G is locked with all the shoes 58 and 71 and is located in its upper position, the lock 30 locks the latch 49 with the latch 31 and the tire is securely locked in position. To dismount the tire G from its support the lock 30 is turned to disengage the latches 49 and 31. Then the tire support is brought to its lowered position as indicated in Fig. 3 and the cam 35 enables the spring 63 by its tension to lower the plunger E and thereby the shoe 58 lowers from the upper portion of the ring 80. The cap 73 when it comes in contact with the bottom 67ª of the tubular end 67 limits the outward movement of the shoe 71 and thereby the tire G can easily be disengaged from the shoes when the arm C is in its lowered position.

It will be noted that the tension of the spring 63 tends to disengage the shoe 58 from the ring 80 and that it is locked thereto by the coaction of the cam 35 and the roller 62, while the springs 76 tend to force the shoes 71 toward the ring 80 and lock them thereto.

Various modifications may be made in the invention, and the present exemplification is only illustrative thereof and not limitative.

Having described my invention what I desire to secure by Letters Patent and claim is:—

1. In a tire support the combination of spring actuated locking shoes to engage the ring of a tire, a third locking shoe for the ring, a spring coacting with the third shoe to withdraw it from said ring and a cam actuated mechanism opposing the latter spring to lock the shoe with said ring.

2. In a tire support the combination of a lifting arm, a hub pivoted to the swinging end of the arm, a cam on the lifting arm, a plurality of tubular arms extending from the hub, spring actuated locking shoes for some of the tubular arms, a locking shoe for another arm, a plunger extending from the latter shoe into its tubular arm, a journal bracket extending from the plunger, a spring bearing against the journal bracket tending to withdraw the shoe from the ring, of a tire and a roller journaled in the said bracket coacting with said cam to lock the latter shoe with said ring.

3. In a tire support the combination of a bracket, a lifting arm with one end hinged to the bracket, a hub pivoted to the other end of the lifting arm, a cam on the lifting arm, arms extending from the hub, spring actuated locking shoes for some of the arms, a locking shoe for another one of the arms, the said cam coacting with the latter shoe and a parallel arm connecting the bracket and said hub.

4. In a tire support the combination of a bracket, a lifting arm with one end hinged to the bracket, a hub pivoted to the other end of the lifting arm, a cam on the swinging end of the lifting arm, arms extending from the hub, spring actuated locking shoes for some of the latter arms, a locking shoe for another one of the said latter arms, said cam coacting with the latter shoe, a parallel arm connecting the bracket and the hub and means to lock the hub to the bracket.

Signed at the borough of Manhattan, city of New York, in the county of New York and State of New York, this 13th day of October, A. D. 1921.

RALPH H. DUNHAM.